(12) United States Patent
Blessent et al.

(10) Patent No.: US 7,471,657 B2
(45) Date of Patent: *Dec. 30, 2008

(54) METHOD AND APPARATUS FOR PROCESSING A PUNCTURED PILOT CHANNEL

(75) Inventors: Luca Blessent, Solana Beach, CA (US); Quaeed Motiwala, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1076 days.

This patent is subject to a terminal disclaimer.

(21) Appl. No.: 09/934,091

(22) Filed: Aug. 20, 2001

(65) Prior Publication Data

US 2002/0009064 A1    Jan. 24, 2002

Related U.S. Application Data

(63) Continuation of application No. 09/298,394, filed on Apr. 23, 1999, now Pat. No. 6,304,563.

(51) Int. Cl.
*H04B 7/216*    (2006.01)

(52) U.S. Cl. .................. 370/335; 370/342; 370/527; 370/529; 375/141

(58) Field of Classification Search ................ 370/352, 370/353, 354, 355, 314, 338, 229, 328, 400, 370/401, 402, 342, 350, 503; 455/435.1, 455/436, 433; 375/141, 146, 147
See application file for complete search history.

(56) References Cited

U.S. PATENT DOCUMENTS

| | | |
|---|---|---|
| 4,901,307 A | 2/1990 | Gilhousen et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,309,474 A | 5/1994 | Gilhousen et al. |
| 5,341,397 A | 8/1994 | Gundmodson |
| 5,416,797 A | 5/1995 | Gilhousen et al. |
| 5,485,486 A | 1/1996 | Gilhousen et al. |
| 5,506,865 A | 4/1996 | Weaver, Jr. |
| 5,566,165 A | 10/1996 | Sawahashi et al. |
| 5,604,730 A | 2/1997 | Tiedemann, Jr. |
| 5,619,526 A | 4/1997 | Kim et al. |

(Continued)

FOREIGN PATENT DOCUMENTS

EP        0674451        9/1995

(Continued)

*Primary Examiner*—Wing F Chan
*Assistant Examiner*—Robert C Scheibel
(74) *Attorney, Agent, or Firm*—Larry J. Moskowitz; Thomas Rouse

(57) ABSTRACT

The punctured pilot channel comprises information symbols of uncertain sign punctured into a sequence of pilot channel symbols of predetermined sign. The apparatus includes an information sign demodulation circuit for determining the sign of the information symbols in response to the pilot channel symbols. A continuous pilot generator generates a non-punctured pilot channel of predetermined sign from the information symbols and the pilot channel symbols. In a first embodiment, the information sign demodulator further comprises a dot product circuit for calculating a dot product of the pilot channel symbols and the punctured information symbols, and a threshold comparator for comparing the dot product to a predetermined threshold.

15 Claims, 8 Drawing Sheets

U.S. PATENT DOCUMENTS

| | | | | |
|---|---|---|---|---|
| 5,680,395 A | * | 10/1997 | Weaver et al. | 370/331 |
| 5,691,974 A | * | 11/1997 | Zehavi et al. | 370/203 |
| 5,764,687 A | * | 6/1998 | Easton | 375/147 |
| 5,838,799 A | | 11/1998 | Cioffi et al. | |
| 5,920,555 A | * | 7/1999 | Hulbert | 370/342 |
| 6,141,332 A | * | 10/2000 | Lavean | 370/335 |
| 6,219,344 B1 | * | 4/2001 | Jones et al. | 370/335 |
| 6,285,663 B1 | * | 9/2001 | Esmailzadeh | 370/311 |
| 6,480,481 B1 | * | 11/2002 | Park et al. | 370/342 |
| 6,633,553 B1 | * | 10/2003 | Hwang | 370/329 |
| 6,788,685 B1 | * | 9/2004 | Holtzman et al. | 370/391 |
| 6,798,736 B1 | * | 9/2004 | Black et al. | 370/208 |

FOREIGN PATENT DOCUMENTS

| | | |
|---|---|---|
| EP | 0810743 | 12/1997 |
| EP | 0903871 | 3/1999 |
| WO | 9503652 | 2/1995 |
| WO | 9745970 | 12/1997 |

* cited by examiner

METHOD AND APPARATUS FOR PROCESSING A PUNCTURED PILOT CHANNEL

CROSS-REFERENCE TO RELATED APPLICATION

This application is a continuation of U.S. application Ser. No. 09/298,394, entitled "METHOD AND APPARATUS FOR PROCESSING A PUNCTURED PILOT CHANNEL", filed Apr. 23, 1999 now U.S. Pat. No. 6,304,563 and assigned to the assignee of the present invention.

FIELD OF THE INVENTION

The present invention relates to wireless communication systems. More particularly, the present invention relates to a novel and improved method and apparatus for processing a pilot channel that has sign ambiguities resulting from puncturing.

DESCRIPTION OF THE RELATED ART

In a wireless radiotelephone communication system, many users communicate over a wireless channel. Communication over the wireless channel can be one of a variety of multiple access techniques that allow a large number of users in a limited frequency spectrum. These multiple access techniques include time division multiple access (TDMA), frequency division multiple access (FDMA), and code division multiple access (CDMA).

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In each of the above patents, the use of a forward-link (base station to mobile station) pilot signal is disclosed. In a typical CDMA wireless communication system, such as that described in EIA/TIA IS-95, the pilot signal is a "beacon" transmitting a constant data value and spread with the same pseudonoise (PN) sequences used by the traffic bearing signals. The pilot signal is typically covered with the all-zero Walsh sequence. During initial system acquisition, the mobile station searches through PN offsets to locate a base station's pilot signal. Once it has acquired the pilot signal, it can then derive a stable phase and magnitude reference for coherent demodulation, such as that described in U.S. Pat. No. 5,764,687 entitled "Mobile Demodulator Architecture For A Spread Spectrum Multiple Access Communication System," issued Jun. 9, 1998, assigned to the assignee of the present invention, and incorporated herein by reference.

Recently, third-generation (3G) wireless radiotelephone communication systems have been proposed in which a reverse-link (mobile station to base station) pilot channel is used. For example, in the currently proposed cdma 2000 standard, the mobile station transmits a Reverse Link Pilot Channel (R-PICH) that the base station uses for initial acquisition, time tracking, rake-receiver coherent reference recovery, and power control measurements. Such a reverse link pilot is described in detail in U.S. Pat. No. 6,396,804, entitled "HIGH DATA RATE CDMA WIRELESS COMMUNICATION SYSTEM", assigned to the assignee of the present invention and incorporated by reference herein.

Punctured into the R-PICH is a Forward Link Power Control Subchannel that carries information on the quality of the forward link (base station to mobile station) as received at the mobile station. This information is used by the base station to adjust the power of the forward link channels that particular mobile station is receiving. The generation of power control measurements by a base station is shown in U.S. Pat. No. 5,056,109, entitled "Method And Apparatus For Controlling Transmission Power In A CDMA Cellular Mobile Telephone System", issued Oct. 8, 1991, assigned to the assignee of the present invention and incorporated herein by reference.

FIG. 1 illustrates an exemplary circuit for generation of the R-PICH in a cdma2000 system. Pilot signal generator 102 generates a constant data value of +1. Power control bit generator 104 generates either a +1 or a −1 data value depending whether the mobile station is experiencing an acceptable frame error rate. In the cdma2000 system, power control bit generator 104 generates one power control bit every 1.25 ms, which equates to one power control bit per power control group. Symbol repeater 106 generates multiple chips representative of the power control bit. In the cdma2000 system, the number of chips generated by the symbol repeater 106 is an integer multiple of 384,depending on the spreading rate. Multiplexer 108 constructs the R-PICH by multiplexing the +1 data value generated by pilot signal generator 102 with the repeated power control chips output from symbol repeater 106. Specifically, multiplexer 108 constructs a stream of power control groups according to FIG. 2.

FIG. 2 illustrates a single power control group 202 of the R-PICH of a cdma2000 system. The sub-blocks 202A-202C each correspond to an integer multiple of 384 chips of the +1 data value generated by pilot signal generator 102 (FIG. 1). The sub-block 202D corresponds to an integer multiple of 384 chips of either the +1 or −1 power control chips generated by power control bit generator 104 and repeated by symbol repeater 106. Thus, as can be seen from FIGS. 1 and 2, in the cdma2000 system, the R-PICH comprises a sequence of +1 data values, multiplexed with forward link power control information of unknown sign. In other words, although the first three-quarters of each power control group 202 are of known sign (+1), the last quarter is of unknown sign. A similar situation (i.e., sign or phase uncertainty) occurs in other wireless communication systems that use a discontinuous or punctured pilot channel.

Because the R-PICH is used by the base station as a coherent reference for data demodulation, a frequency reference for frequency tracking, and a received power reference for power control measurements, the uncertainty introduced in the otherwise constant data value by the forward link power control subchannel introduces possible degradations in performance. In other words, the puncturing in of the forward link power control subchannel into the R-PICH degrades the reverse link performance (as measured by the base station) with respect to a continuous pilot channel. For example, one major effect of the punctured pilot channel is that signal to noise ratio of the channel phase estimate calculated by the base station is decreased, resulting in an average loss of 0.3 dB in required $E_b/N_b$ for a given frame error rate (FER) of 1% if the sign uncertainty of the forward link power control subchannel is not used in the channel phase estimate (i.e., the corresponding power control chips are blanked before being processed by the channel phase estimator).

Thus, a method and apparatus is needed for preventing these degradations in reverse link performance caused by puncturing information bits of uncertain sign into an otherwise continuous pilot channel.

SUMMARY OF THE INVENTION

The present invention is a novel and improved method and apparatus for processing a punctured pilot channel. The punctured pilot channel comprises information symbols of uncertain sign punctured into a sequence of pilot channel symbols of predetermined sign. The apparatus includes an information sign demodulation circuit for determining the sign of the information symbols in response to the pilot channel symbols. A continuous pilot generator generates a non-punctured pilot channel of predetermined sign from the information symbols and the pilot channel symbols.

In a first embodiment, the information sign demodulator further comprises a dot product circuit for calculating a dot product of the pilot channel symbols and the punctured information symbols, and a threshold comparator for comparing the dot product to a predetermined threshold. In an alternate embodiment, the information sign demodulator further comprises a sum circuit for calculating an energy in a sum of the pilot channel symbols and the punctured information symbols, a difference circuit for calculating an energy in a difference of the pilot channel symbols and the punctured information symbols, and a maximum selector for selecting a maximum of the energy in the sum and the energy in the difference.

The present invention also provides for specific applications of the non-punctured pilot channel. For example, a pilot filter for generating a channel phase estimate from the non-punctured pilot channel, and a cross product circuit for generating a frequency error estimate from the non-punctured pilot channel. Various other applications and embodiments are disclosed. The present invention also encompasses a method to be carried out, for example, by the apparatus disclosed herein.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Overview

The present invention, broadly stated, encompasses a method and apparatus for accounting for the sign uncertainty introduced by puncturing information bits of uncertain sign into an otherwise continuous pilot channel. The present invention resolves the sign ambiguity in the information bits punctured into the pilot channel, and then uses that decision to reconstruct a continuous-phase pilot channel that may be used thereafter for any application for which a continuous-phase pilot channel is advantageous. For simplicity and clarity of disclosure, the present invention will be disclosed with reference to an exemplary CDMA wireless communication system operating in accordance with the principles outlined in the cdma2000 standard. However, it should be understood that the inventive principles described herein are equally applicable to other wireless communication systems that employ a punctured or discontinuous pilot channel. For example, various embodiments of the present invention are equally applicable to the wideband CDMA (W-CDMA) standard(s), as well as many of the other proposed 3G communication standards. The term "bit" or "bits" as used herein is often used alongside the term "chip" or "chips". It will be understood by one of ordinary skill in the art that "bit" refers to a unit of information, whereas "chip" refers to a unit of the spreading code used in a CDMA system. However, the use of the term "chip" herein is merely for accuracy in explanation and is not intended to limit the present invention to CDMA systems. The present invention is equally applicable to systems that do not spread "bits" of information with "chips" of a spreading code.

Figure 3:
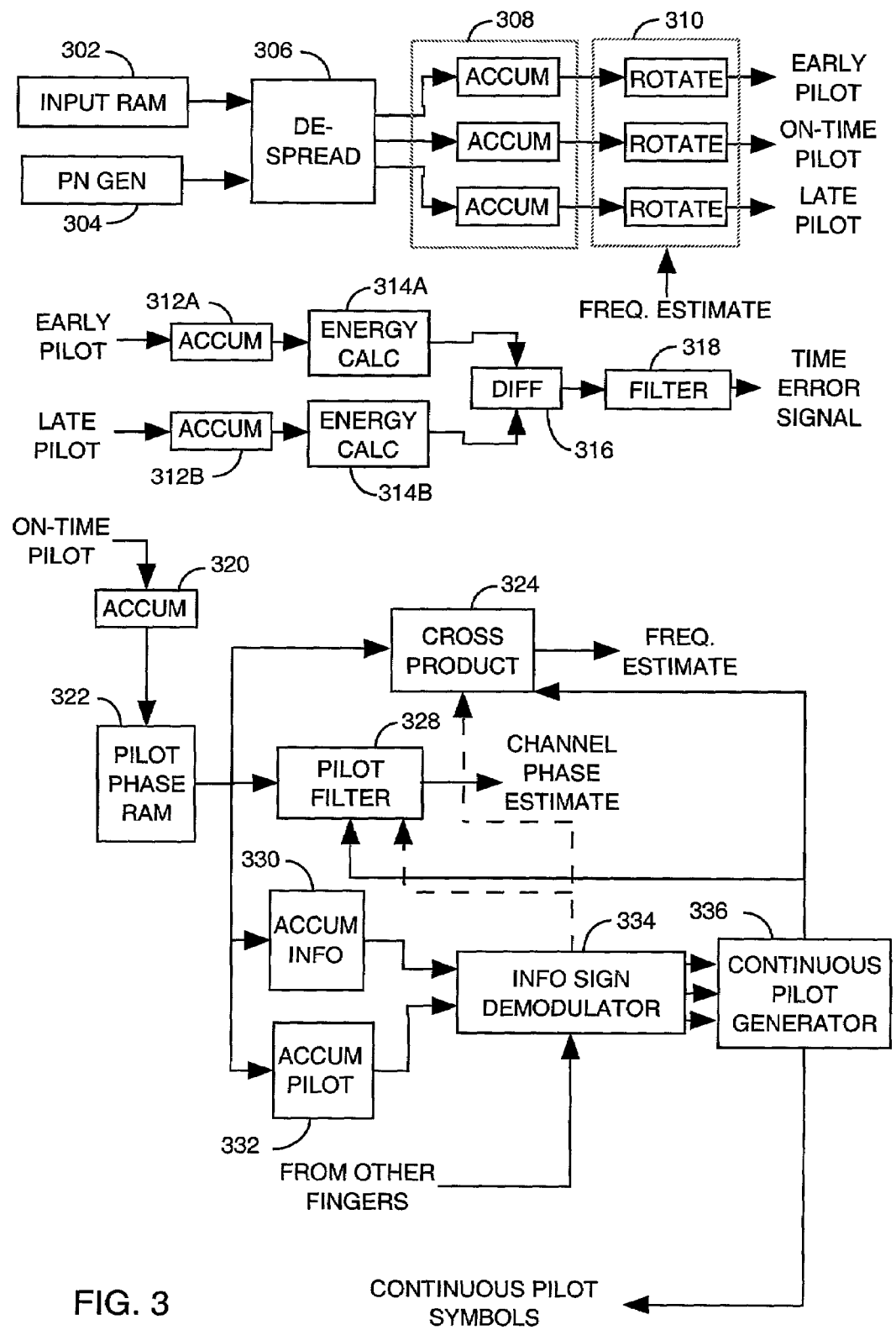
FIG. 3 is a functional block diagram of a generic pilot demodulation apparatus of the present invention.

Turning now to FIG. 3, a functional block diagram of a generic pilot demodulation apparatus of the present invention is illustrated. In FIG. 3, and all subsequent Figures, for clarity and simplicity single lines are intended to represent both real and complex signals. In FIG. 3, input RAM 302 stores samples of the received waveform and provides them to despreader 306 where they are despread using a pseudonoise ("PN", also referred to as "pseudorandom) code generated by PN generator 304. Despreader 306 provides three outputs. One comprises a sequence of despread chips that were despread with a negative one-half chip (early) PN offset. The second comprises a sequence of despread chips that were despread with a positive one-half chip (late) PN offset. The third comprises a sequence of despread chips that were despread with a zero offset (on time) PN sequence. The three despread chip sequences output from despreader 306 are respectively interpolated to increase resolution and accumulated in accumulators 308, and respectively rotated in accordance with a frequency estimate (discussed further below) in phase rotators 310. The resultant output from phase rotators 310 are the three separate pilot sequences, early pilot, on-time pilot, and late pilot which are further processed as described below.

The early and late pilot outputs are presented to accumulators 312A, 312B where they are accumulated over a predetermined number of chips. The accumulated symbols output from accumulators 312A, 312B are then respectively input to energy calculators 314A and 314B. Energy calculators 314A and 314B calculate the energy contained in the accumulated symbols of the early and late pilots, respectively. For example, if the early and late pilots are QPSK-encoded, the energy calculators 314A, 314B calculate the energy using the relationship $I^2+Q^2$, where I and Q are the in-phase and quadrature phase components of the signals, respectively.

The difference between the energy in the early pilot and the late pilot is then calculated by subtractor 316 to generate a value indicative of the time tracking error of the PN generator 304 for this finger of the rake receiver. The resultant difference value output by subtractor 316 is then filtered in filter 318 and provided as a time error signal for further use by other circuitry (not shown). For example, filter 318 may include an accumulator and/or other processing circuitry for smoothing the instantaneous variation in the time error signal.

Figure 1:
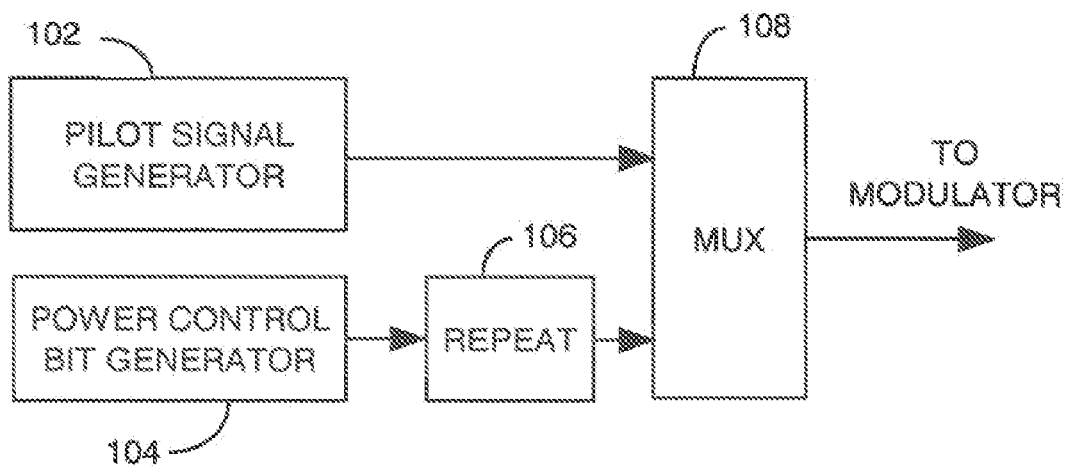
FIG. 1 is an exemplary functional block diagram of a circuit for generating a punctured pilot channel.
Figure 2:
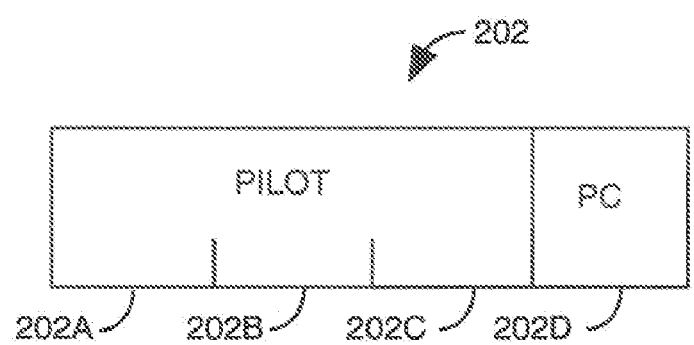
FIG. 2 is a diagram of a single power control group of the reverse link pilot channel of an exemplary CDMA system based on the cdma2000 standard.

The on-time pilot sequence output by rotator 310 is input to accumulator 320 where it is accumulated over a predetermined number of chips, in accordance with the current position of the pilot sequence in the power control group 202 (FIG. 2). The accumulated chips are provided to pilot phase RAM 322 where they are temporarily stored for further processing. The construction of pilot phase RAM 322 will be discussed in more detail below.

The accumulated pilot chip sequences stored in pilot phase RAM 322 are accessed by sign ambiguity resolution circuitry (accumulators 330 and 332, information sign demodulator 334). In some embodiments, they may also be accessed by frequency estimating circuitry (cross product circuit 324) and pilot filter 328. These circuits are discussed in detail below.

II. Information Sign Demodulation and Construction of Continuous Phase Pilot

Information accumulator 330 accumulates the information chips 202D from each power control group 202. Pilot accumulator 332 accumulates the pilot chips 202A-202C of each power control group 202. These accumulations of information chips 202D and pilot chips 202A-202C are provided to information sign demodulator 334 for resolution of the sign ambiguity of the information chips 202D in each power control group 202. In response to the accumulated information chips from information accumulator 330, the accumulated pilot chips from pilot accumulator 332 and (in a rake receiver) similar accumulations from other fingers (other multipaths), information sign demodulator 334 generates an information sign decision which is thereafter used to reconstruct a continuous pilot channel in continuous pilot generator 336. Continuous pilot generator 336 generates a sequence of continuous pilot symbols, without the information chips, for use in applications (described below) which would benefit from a continuous pilot.

Figure 4:
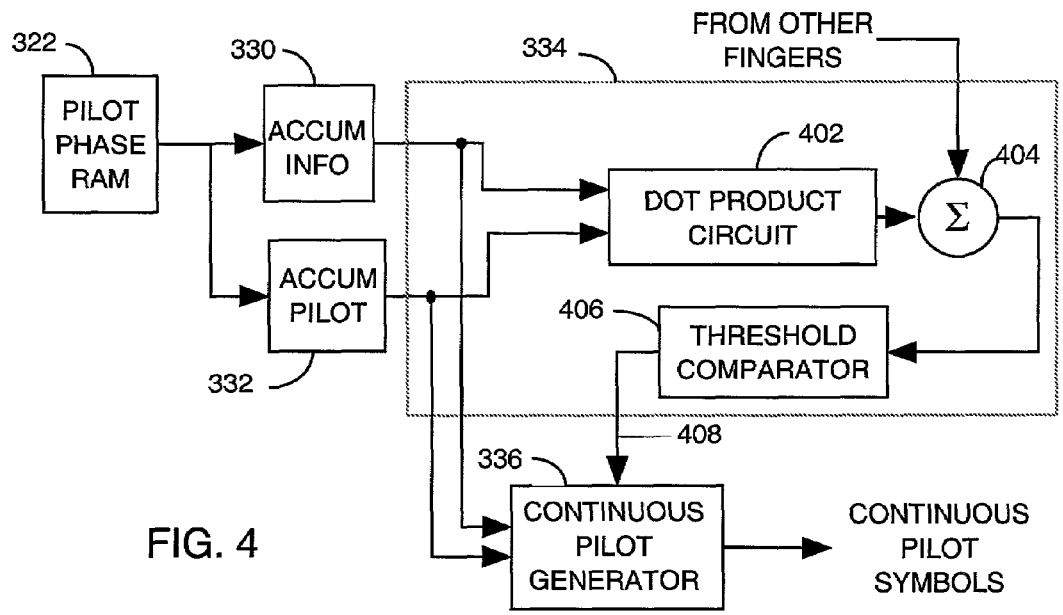
FIG. 4 is a functional block diagram of a first embodiment of the information sign demodulator of the present invention.
Figure 5:
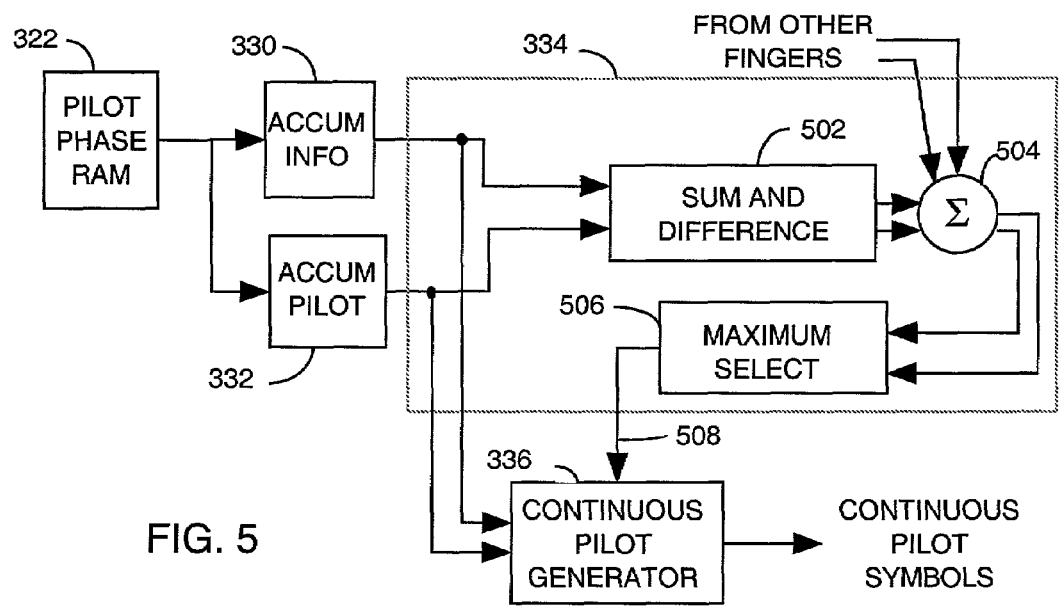
FIG. 5 is a functional block diagram of a second embodiment of the information sign demodulator of the present invention.

FIGS. 4 and 5 illustrate functional block diagrams of alternate embodiments of the information sign demodulator 334. In FIG. 4, the accumulated information chips from information accumulator 330 and the accumulated pilot chips from pilot accumulator 332 are provided to dot product circuit 402. Dot product circuit 402 determines the magnitude of the accumulated information chip vector in-phase with the accumulated pilot chip vector according to the dot product calculation of Equation (1):

$$P \cdot I = P_i {}^* I_i + P_q {}^* I_q \qquad (1)$$

where P is the accumulated pilot chip vector;
I is the accumulated information chip vector; and
i, q subscripts refer to the in-phase and quadrature-phase components of the complex received signals, respectively.

Circuits for calculating dot products are well known in the art. An example is given in U.S. Pat. No. 5,506,865, entitled "PILOT CARRIER DOT PRODUCT CIRCUIT", issued Apr. 9, 1996, assigned to the assignee of the present invention and incorporated herein by reference.

The magnitude of the output of dot product circuit 402 is the dot product of the accumulated pilot chips 202A-202C with the accumulated information chips 202D. In the exemplary embodiment employing a rake receiver to take advantage of the coherent combination of multipath signals, the outputs of other similar dot product circuits from other fingers (not shown) is summed in summer 404 with the output of dot product circuit 402, and the sum provided to threshold comparator 406. Threshold comparator 406 compares the magnitude of the sum output from summer 404 with a predetermined threshold. Because the information chips 202D are transmitted un-encoded, BPSK modulated, and in-phase with the pilot chips 202A-202C, this comparison will determine the sign of the information chips 202D for each power control group 202. If the sum is greater than the threshold, then the sign is positive (the information chips are a logical '0'). If the sum is less than the threshold, then the sign is negative (the information chips are a logical '1'). The function performed by information sign demodulator 334 may be described by Equation (2):

$$\left( \sum_k P_k \cdot I_k \right) \Bigg|_{sum<T \Rightarrow 1}^{sum \geq T \Rightarrow 0} \qquad (2)$$

where the summation variable, k, corresponds to the fingers in-lock, and T is the threshold.

The output 408 of threshold comparator 406 is an indication of the sign of the information chips 202D. This indication 408 is used to reconstruct a continuous pilot signal in continuous pilot generator 336. Continuous pilot generator 336 receives the accumulated information chips from information accumulator 330, as well as the accumulated pilot chips from pilot accumulator 332. In response to the sign indication 408 from threshold comparator 406, continuous pilot generator 336 recombines the accumulated pilot chips with the accumulated information chips, inverting the sign of the accumulated information chips if necessary to match the sign of the accumulated pilot chips, thereby generating a continuous pilot channel.

Figure 6:
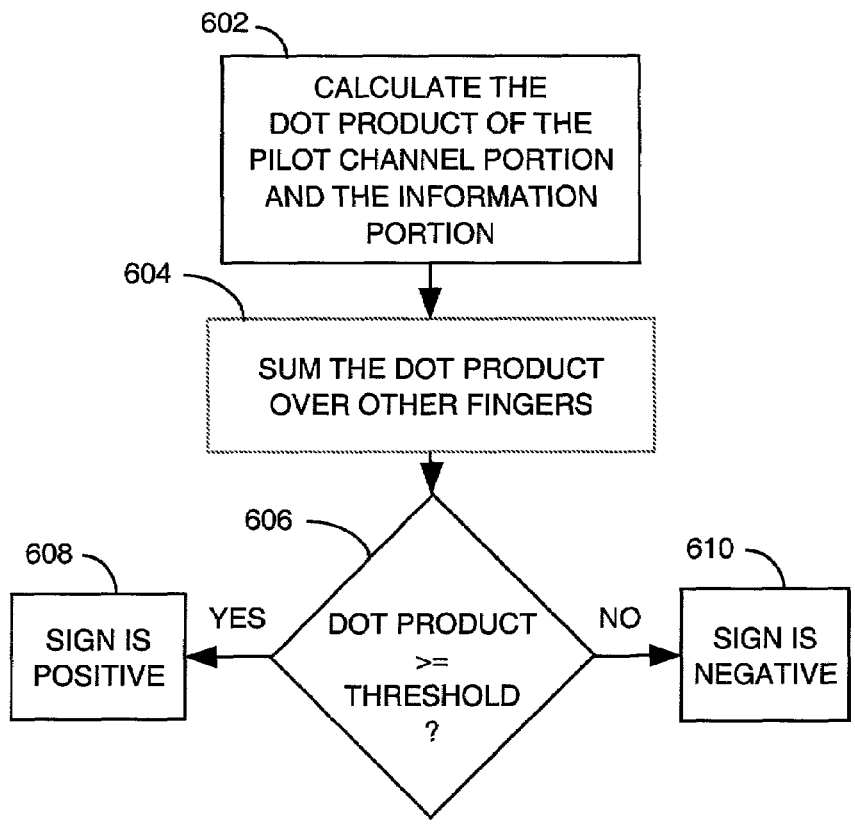
FIG. 6 is a flow diagram of a first embodiment of the information sign demodulation method of the present invention.

As can be seen in FIG. 4, the pilot channel portions 202A-202C of each power control group 202 are used as a coherent phase reference in dot product circuit 402 to demodulate the information chips 202D. In other words, a first portion of the power control group 202 is used to demodulate a second portion of the same power control group. The dot product is then compared to a threshold in threshold comparator 406 to generate the information chip sign decision 408. FIG. 6 illustrates a flow diagram of a first embodiment of the information chip sign demodulation method of the present invention. This method may be performed, for example, by the circuit of FIG.

4. At block 602, the dot product of the pilot channel portion 202A-202C and the information chip portion 202D is calculated. This step may be performed, for example, by dot product circuit 402. Optionally, at block 604, the dot product calculated in block 602 may be summed over other fingers. This summation may be performed, for example, by summer 404. At decision 606, a comparison is made between the dot product and a predetermined threshold. In a BPSK modulation scheme, the predetermined threshold is preferably zero. However, in the general case, the threshold may be other than zero for other modulation schemes. Indeed, in the most general case, the threshold could be a range. If the dot product is greater than or equal to the predetermined threshold, then the flow proceeds to block 608 where the sign of the information chip portion is determined to be positive (i.e., of the same sign as the pilot channel portion). However, if the dot product is less than the predetermined threshold, then the flow proceeds to block 610 where the sign of the information chip portion is determined to be negative (i.e., opposite of the sign of the pilot channel portion). The threshold comparison of decision 606 and sign determinations of blocks 608 and 610 may be accomplished, for example, by threshold comparator 406.

Turning now to FIG. 5, a functional block diagram of an alternate embodiment of information sign demodulator 334 is shown. Similar to FIG. 4, accumulated information chips and accumulated pilot chips are respectively output by information accumulator 330 and pilot accumulator 332. However, in contrast to the dot product circuit 402 of FIG. 4, these accumulations are input to sum and difference circuit 502. Sum and difference circuit 502 generates the energy in the sum of the accumulated pilot chips 202A-202C and information chips 202D, and energy in the difference of the accumulated pilot chips 202A-202C and information chips 202D. These sum and difference energy values are provided to summer 504, where they are combined with similar sum and difference energy values from other in-lock fingers (not shown) of the rake receiver. Summer 504 combines the sum energy value from this finger with the sum energy values from other fingers. Summer 504 also combines the difference energy value from this finger with the difference energy value from other fingers. The resultant values output from summer 504 are a combined sum energy value, and a combined difference energy value.

Maximum selector 506 selects the maximum of the combined sum energy value and the combined difference energy value. Because the information chips 202D are transmitted un-encoded, BPSK modulated, and in-phase with the pilot chips 202A-202C, this maximum selection will determine the sign of the information chips 202D for each power control group 202. If the combined sum energy value is greater than or equal to the combined difference energy value, then the sign of the information chips 202D is determined to be positive (logical '0'). On the other hand, if the combined sum energy value is less than the combined difference energy value, then the sign of the information chips 202D is determined to be negative (logical '1'). Thus, the information sign demodulator 334 of FIG. 5 performs the function of Equation (3):

$$\left(\text{Max}\left(\sum_k E[P+I]_k, \sum_k E[P-I]_k\right)\right)\Big|_{\text{Max}=E[P-I]\Rightarrow 1}^{\text{Max}=E[P+I]\Rightarrow 0} \quad (3)$$

where the summation variable, k, corresponds to the number of fingers in lock in the rake receiver and the function E[ ] is energy calculation. Similar to output 408 of FIG. 4, output 508 of maximum selector 506 is an indication of the sign of the information chips 202D. This indication 508 is used to reconstruct a continuous pilot signal in continuous pilot generator 336 as previously explained with reference to FIG. 4. Thus, in both FIGS. 4 and 5, the information sign demodulator 334 is used to resolve the sign ambiguity of the information chips 202D.

Figure 7:
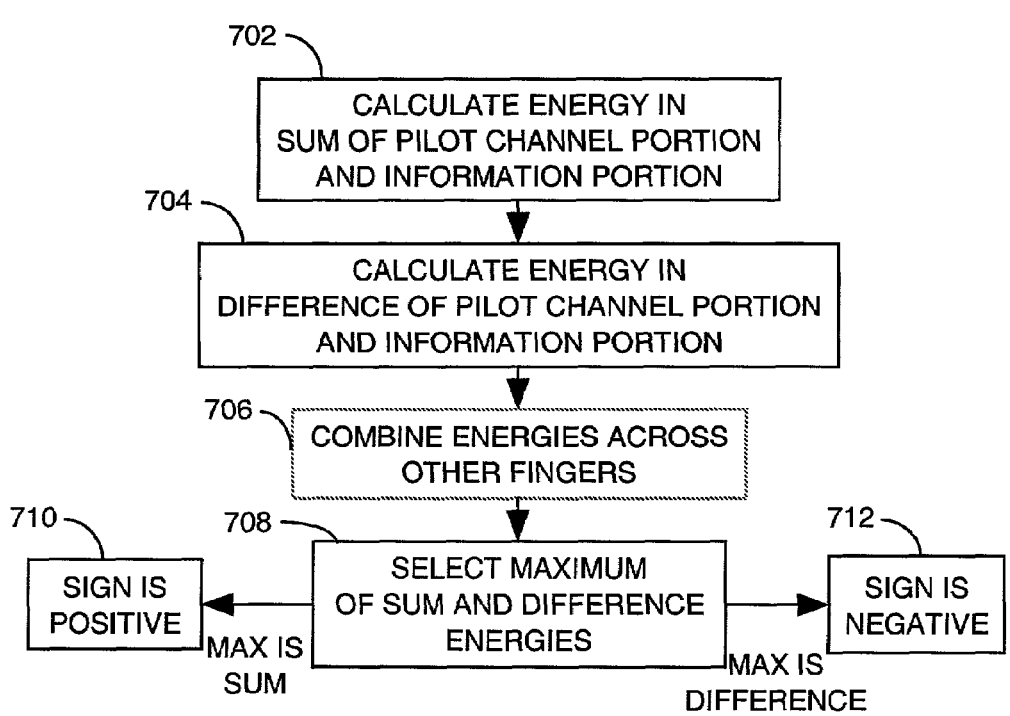
FIG. 7 is a flow diagram of a second embodiment of the information sign demodulation method of the present invention.

FIG. 7 illustrates a flow diagram of a second embodiment of the information chip sign demodulation method of the present invention. The method of FIG. 7 may be performed, for example, by the circuit of FIG. 5. At block 702, the energy of the sum of the pilot channel portion 202A-202C and information chip portion 202D is calculated. In block 704, the energy of the difference of the pilot channel portion 202A-202C and information chip portion 202D is calculated. These calculations may be performed, for example, by sum and difference circuit 502. Optionally, at block 706, the sum and difference energies calculated at blocks 702 and 704, may be respectively combined across other fingers. This combination may be performed, for example, by summer 504. At block 708, the maximum of the calculated sum and difference energies is selected. If the maximum is the sum of the energies, then the information chip portion 202D sign is determined to be positive at block 710. If the maximum is the difference of the energies, then the information chip portion 202D sign is determined to be negative at block 712. The maximum selection of block 708 and the sign determination of blocks 710 and 712 may be performed, for example, by maximum selector 506.

III. Pilot Phase RAM

Turning back to FIG. 3, a presently preferred embodiment of pilot phase RAM 322 will now be described. It should be understood that the particular implementation of the pilot phase RAM 322 described herein is given merely as an example, and that other constructions may be used without departing from the present invention. For example, the specific numerology used, and the RAM size and partitioning are merely exemplary and could be modified without the use of inventive faculty.

Figure 8:
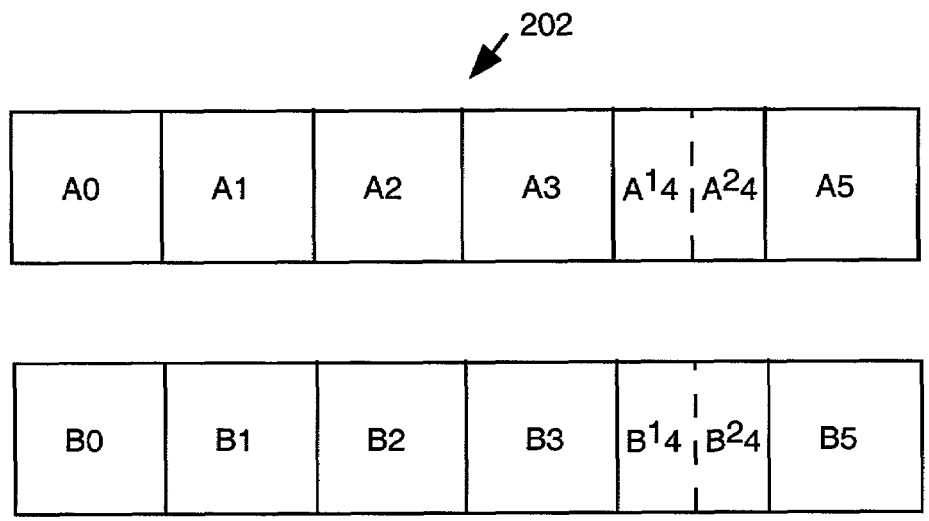
FIG. 8 is a diagram of two consecutive power control groups of the reverse link pilot channel of an exemplary CDMA system.

For clarity of notation in explaining the presently preferred embodiment of pilot phase RAM 322, FIG. 2 is redrawn, slightly modified, as FIG. 8. FIG. 8 illustrates two power control groups 202 divided into six symbols of equal length. The first power control group comprises symbols A0-A5, and the second power control group comprises symbols B0-B5. Each symbol comprises 256 chips. The first power control group corresponds to even phase power control groups, and the second power control group follows after the first and corresponds to odd phase power control groups. The A4 and B4 symbols of both power control groups are shown to be divided in half with a dashed line to form two sub-symbols, $A^14, A^24$, and $B^14, B^24$, respectively. Each sub-symbol, $A^14$, $A^24$, and $B^14$, $B^24$, comprises 128 chips. The symbols A0-$A^14$ and B0-$B^14$ correspond to portions 202A-202C of FIG. 2. In other words, symbols A0-$A^14$ and B0-$B^14$ of FIG. 8 are each the non-punctured pilot channel symbols. The symbols $A^24$-A5 and $B^24$-B5 correspond to the portion 202D of FIG. 2. In other words, symbols $A^24$-A5 and $B^24$-B5 of FIG. 8 are each the punctured information symbols.

As stated above, accumulator 320 accumulates the on-time pilot output from rotator 310. In the presently preferred embodiment applicable to a cdma2000 system, the accumulator 320 accumulates individual symbols of each power control group. For symbols A0-A3 and B0-B3 of FIG. 8, accumulator 320 accumulates all 256 chips of each symbol in turn before passing the accumulated 256 chips to pilot phase RAM 322. However, for sub-symbols $A^1 4$ and $B^1 4$, accumulator 320 accumulates the 128 chips of the sub-symbols in turn before passing them to pilot phase RAM 322. Finally, for symbols $A^2 4$ and A5, as well as $B^2 4$ and B5, accumulator 320 accumulates all 384 chips in turn before passing them to pilot phase RAM 322.

Figure 9:
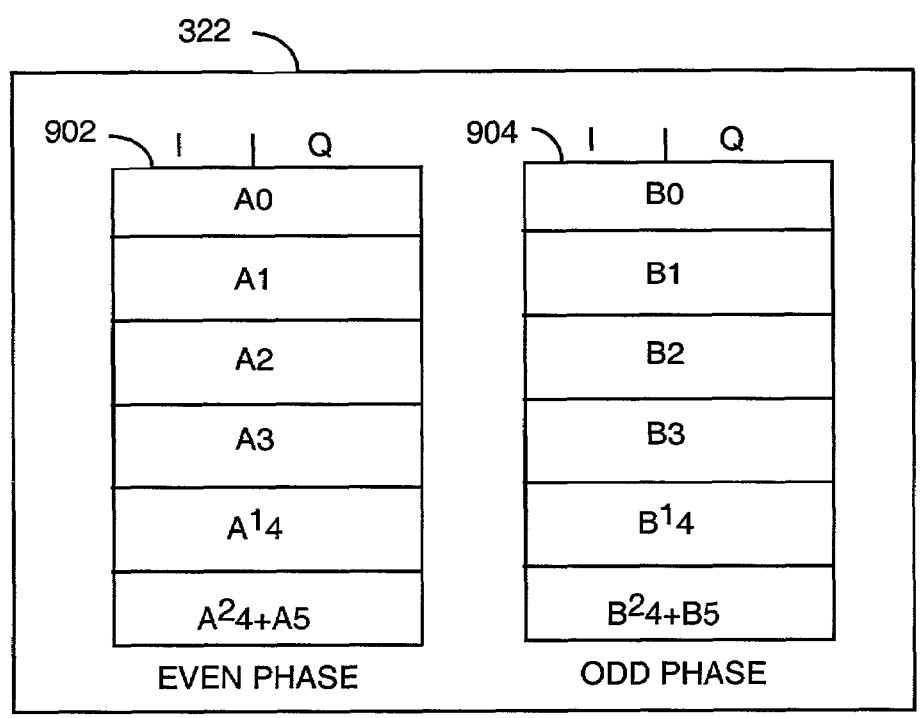
FIG. 9 is an exemplary structure of the pilot phase RAM of the present invention.

An exemplary structure of pilot phase RAM 322 is shown in FIG. 9. FIG. 9 illustrates two memory areas. Even phase memory area 902 contains the complex I and Q pilot symbols A0-A3, and $A^1 4$ (the non-punctured pilot symbol portions of the power control group) stored individually, with symbols $A^2 4$ and A5 (the punctured information symbol portions) combined in storage. This grouping corresponds to the individual accumulations made by accumulator 320 as it writes the accumulations to the pilot phase RAM 322. Odd phase memory area 904 is of similar construction, storing individual accumulations for the odd phase power control groups.

Thus, pilot phase RAM 322 stores two consecutive power control groups in a form convenient for use by the remainder of the circuit elements of FIG. 3. For example, information accumulator 330 (FIG. 3) is able to read out the last slot of either even phase memory area 902 or odd phase memory area 904 to obtain the information chips for each power control group 202. Likewise, pilot accumulator 332 is able to read out the first five slots of either even phase memory area 902 or odd phase memory area 904 to obtain the non-punctured pilot symbols for each power control group 202. Thus, the storage techniques of pilot phase RAM 322 facilitate the demodulation of the information chip sign.

Again, it should be noted that pilot phase RAM 322 could be of a different size or structure without departing from the present invention. For example, rather than processing 256 chips at one time, accumulator 320 and pilot phase RAM 322 might process 128 chips at one time, or 384 chips at one time, it being understood that both 128 and 384 are integer factors of the overall power control group 202 length of 1,536 chips. Furthermore, it is understood that for higher chip rates, processing may occur such intervals as 128N chips, 256N chips, or 384N chips.

IV. Pilot Filter

One advantage of a continuous phase pilot channel is that it can be used as a coherent reference for demodulation. Thus, the present invention also provides a pilot filter 328 that takes into account the phase discontinuities inherent in the punctured R-PICH. As shown in FIG. 3, pilot filter 328 is provided with the information chip sign decision either directly from information sign demodulator 334, or implicitly through the continuous phase pilot constructed by continuous phase pilot generator 336. In response to this information, pilot filter 328 generates a channel phase estimate that is not degraded by the phase discontinuity inherent in the R-PICH.

Figure 10:
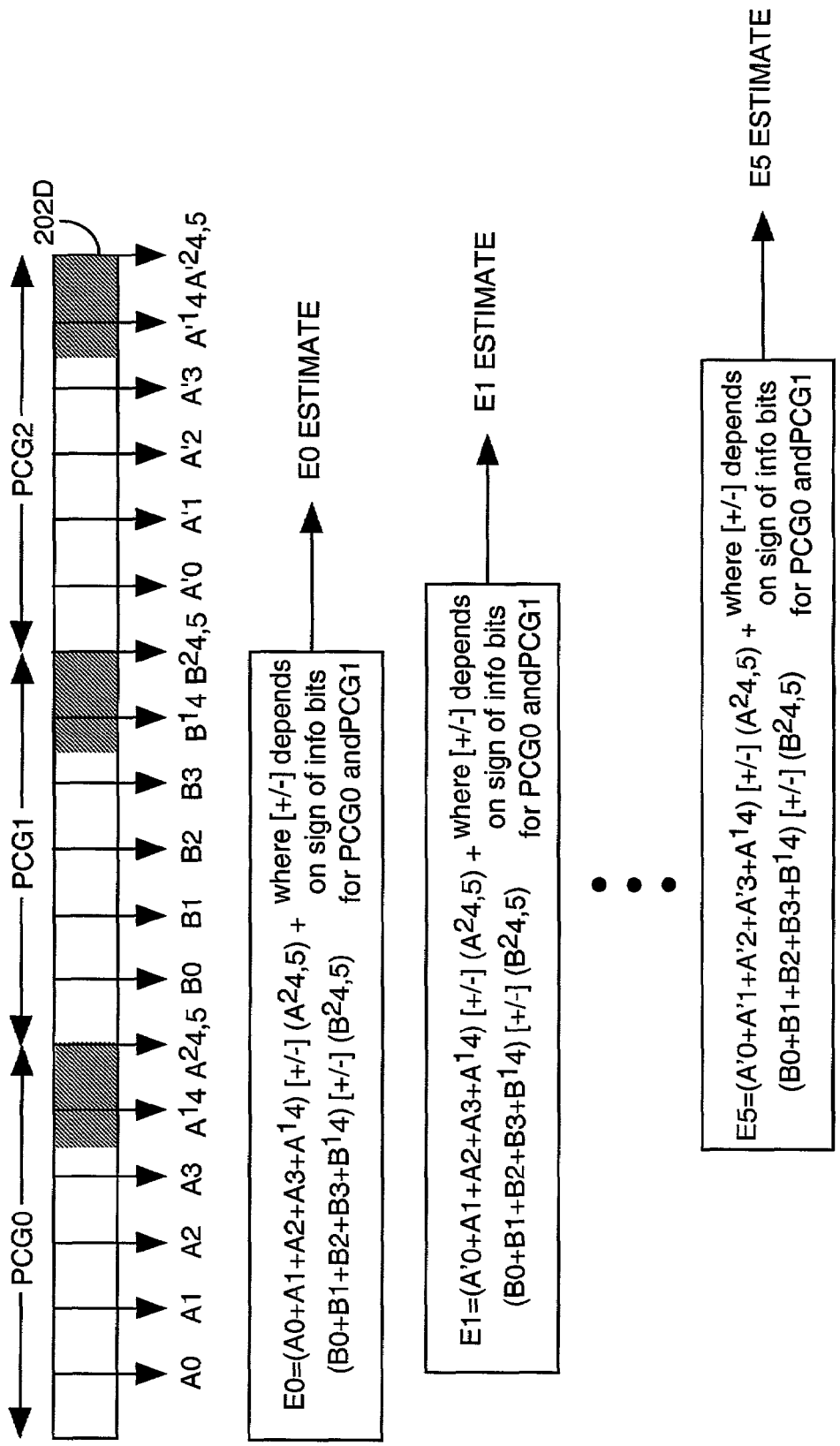
FIG. 10 is a graphical illustration of the sliding window nature of the phase estimation performed by the pilot filter of the present invention.

In the preferred embodiment, pilot filter 328 is a "sliding window" filter that is a 12 tap finite impulse response (FIR) filter of 2.5 ms in length. FIG. 10 is an illustration of the sliding window nature of the phase estimation performed by pilot filter 328. In FIG. 10, three consecutive power control groups, PCG0, PCG1, and PCG2 of the R-PICH are illustrated. Each PCG has a marked region corresponding to information chips 202D. Each PCG is also shown as being divided into six 256 chip symbols. At the end of each of the 256 chip symbols, an arrow points down to the accumulated symbol that has been accumulated by accumulator 320 and stored in pilot phase RAM 322. The symbols for PCG0 are A0-$A^2 4$,5. The symbols for PCG1 are B0-$B^2 4$,5. The symbols for PCG2 are A'0-$A'^2 4$,5. (Note the slight change in notation from previous Figures. For example, in FIG. 10, the notation $A^2 4,5$ is used to represent the symbol that spans 384 chips from the second half of the fifth 256-chip symbol to the end of the sixth 256-chip symbol. Also note that for PCG2, the notation A' ("A prime") is used to differentiate it from the first even-phase power control group, PCG0.) Under normal circumstances, the three power control groups PCG0, PCG1, and PCG2 arrive consecutively. PCG0, PCG1, and PCG2 are representative of any three power control groups transmitted on the R-PICH.

Illustrated below the three power control groups are three blocks that each span a portion of the three power control groups PCG0, PCG1, and PCG2. Each of the three blocks represents a different phase estimate calculation performed by pilot filter 322. The first block, representing the first phase estimate calculation (E0 estimate) is shown as spanning the range from the beginning of the first symbol (A0) of PCG0 to the end of the last symbol ($B^2 4,5$). Thus, the E0 estimate is calculated in response to the symbols included in PCG0 and PCG1, and spanned by the first block. The mathematical formula used to generate the E0 estimate is given inside the first block. As can be seen from this mathematical formula, the E0 estimate is the combination or sum of the non-punctured pilot channel symbols, plus or minus the punctured information symbols from PCG0 and PCG1. As noted, whether the punctured information symbols are added or subtracted from the punctured pilot channel symbols depends on the sign of the information chips for each power control group as determined by information sign demodulator 334.

Similarly, the second block of FIG. 10 represents the E1 phase estimate calculated by pilot filter 328. The notable difference between the first block (E0 estimate) and the second block (E1 estimate) is that the E1 estimate block is shifted ahead in time by one symbol. The E1 estimate block spans the range from symbol A1 of PCG0 to symbol A'0 of PCG2. As a result, the E1 estimate is based in part on A'0 of PCG2, rather than A0 of PCG0. The final block of FIG. 10 represents the E5 phase estimate calculated by pilot filter 328. Again, the E5 estimate block is shifted ahead in time, spanning the $A^1 4$ symbol of PCG0 to the A'3 symbol of PCG2. As a result, the E5 estimate is based on these included symbols. Again, in each phase estimate the decision whether to add or subtract the punctured information chip symbols depends on the sign of the information chip symbols as determined by information sign demodulator 334.

In one embodiment of pilot filter 328, pilot filter 328 itself reads the symbols from the even and odd phase memory areas 902 and 904 of pilot phase RAM 322. In this embodiment, the pilot filter 328 also receives an indication of the sign of the demodulated information chips from information sign demodulator 334 and uses that indication to determine whether to add or subtract the information symbols in its phase estimate calculations described above. In an alternate embodiment of pilot filter 328, the continuous pilot generator 336 provides continuous pilot symbols to pilot filter 328. In this alternate embodiment, the information chip sign indication is inherent in the continuous pilot symbols. As a result, pilot filter 328 need not read the symbols directly from pilot phase RAM 322 nor receive a sign indication from information sign demodulator 334.

V. Reverse-Link Power Control Decision

For every power control group in a cdma2000 system, the modulator in the base station (not shown) sends a power control command which is punctured on the forward link. The purpose of this reverse link power control command is to direct the mobile station (not shown) to increase or decrease transmit power. These power control commands are often referred to in the above-incorporated U.S. Patents as "closed loop" power control commands. The reverse link power control command is computed by the base station in response to the received pilot channel energy for that particular mobile station. Thus, the reverse link power control decision is yet another useful application for the present invention's demodulation of the information chip symbols and reconstruction of a continuous phase pilot channel.

Figure 11:
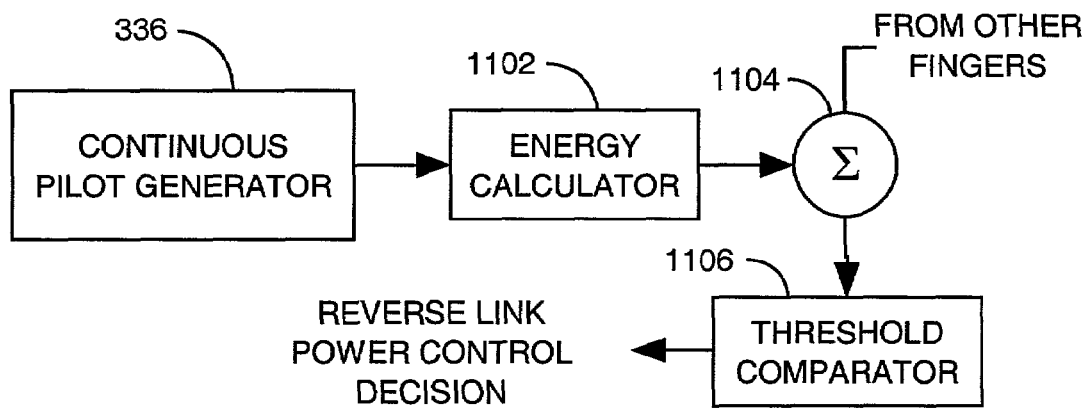
FIG. 11 is a functional block diagram of an exemplary embodiment of a reverse-link power control decision circuit of the present invention.

FIG. 11 illustrates a functional block diagram of an exemplary embodiment of a reverse-link power control decision circuit of the present invention. Continuous pilot generator 336 generates a continuous sequence of pilot symbols as described above. These pilot symbols are provided to energy calculator 1102. Energy calculator 1102 calculates the energy in the continuous pilot symbols, and outputs an energy value indicative of that energy calculation to summer 1104. Summer 1104 combines the energy values from this and other in-lock fingers to produce a combined energy value. The combined energy value is compared to a threshold in threshold comparator 1106. If the combined energy value is greater than or equal to the threshold, then threshold comparator 1106 outputs a reverse link power control decision indicating that the mobile station (not shown) should "turn down" or decrease its transmit power. Conversely, If the combined energy value is less than the threshold, then threshold comparator 1106 outputs a reverse link power control decision indicating that the mobile station (not shown) should "turn up" or increase its transmit power. This reverse link power control decision is then forwarded to the appropriate modulation circuitry (not shown) for transmission to the particular mobile station of interest.

In a first embodiment of the reverse link power control decision circuitry of the present invention, energy calculator 1102 computes the energy of the pilot symbols by computing the energy estimate of the two components of the pilot (the non-punctured pilot symbols and the punctured information symbols), and combining them over all fingers in-lock according to Equation (4):

$$\sum_k (P^2 + I^2)_k \quad (4)$$

where the summation variable, k, corresponds to the number of fingers in-lock. In a second embodiment, energy calculator 1102 computes the energy of the pilot symbols by computing the energy estimate of the coherent accumulation of the non-punctured pilot symbols and the punctured information symbols, and combining them over all fingers in-lock according to Equation (5):

$$\left( \sum_k E[P \pm I]_k \pm \sum_k P_k \cdot I_k \right) \Big|_{\text{dot\_prod} < T \Rightarrow \text{subtract}}^{\text{dot\_prod} \geq T \Rightarrow \text{add}} \quad (5)$$

where the summation variable, k, corresponds to the number of fingers in lock. This second embodiment is presently believed to give slightly better performance over the first embodiment when the mobile station (not shown) is moving relatively slowly. However, either embodiment may be used depending on the intended environment.

It should be noted that in the second embodiment, the dot products and the sum of the dot products for all fingers in-lock may be computed by the embodiment of information sign demodulator 334 shown in FIG. 4. Thus, if the circuit of FIG. 4 is used in combination with the second embodiment of the energy calculator 1102 of FIG. 11, then the only additional term that must be calculated by the energy calculator 1102 is the energy of the combination of the non-punctured pilot symbols and punctured information symbols across all fingers in lock. Additionally, the same multiplier (not shown) within dot product circuit 402 of FIG. 4 that calculates the dot product can be used to calculate the square terms of Equation (5) above.

VI. Finger In/Out of Lock Detection

Yet another application for the continuous pilot reconstruction techniques of the present invention is for the determination of when a finger using the present invention is in or out of lock. In simple terms, a finger is said to be "in-lock" when the energy of the multipath component that it is demodulating meets or exceeds a predetermined threshold. Conversely, a finger is said to be "out of lock" when the energy of the multipath component that it is demodulating falls below the predetermined threshold. When a finger is "in-lock" it is processing sufficient energy to reliably demodulate a multipath component. When a finger is tracking a pilot channel that has phase discontinuities such as the R-PICH of a cdma2000 system, it will give a more reliable in or out of lock indication at low speeds when it can coherently accumulate the pilot and the information chips in a longer coherent accumulation window. Thus, the present invention may also be used to improve the performance of the finger in or out of lock determidnation.

Figure 12:
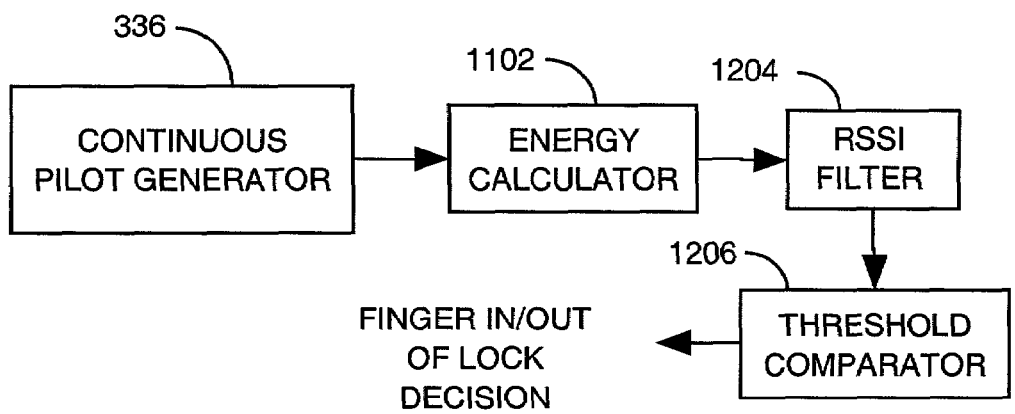
FIG. 12 is a functional block diagram of an exemplary circuit for determining whether an individual finger is in or out of lock.

FIG. 12 illustrates an exemplary functional block diagram of a circuit for determining whether an individual finger is in or out of lock. Similar to FIG. 11, the continuous pilot generator 336 described above outputs a stream of continuous pilot symbols reconstructed from the discontinuous R-FICH. The energy of these pilot symbols is measured in energy calculator 1102 as described with respect to either of the embodiments of FIG. 11. The energy value output from energy calculator 1102 is then input to received signal strength indicator (RSSI) filter 1204 where it is integrated over a predetermined time period. The resultant integrated energy value is then compared to a predetermined threshold in threshold comparator 1206. If the integrated energy value is greater than or equal to the predetermined threshold, then threshold comparator 1206 generates and indication that the finger is in-lock (i.e., is receiving sufficient multipath energy to be considered reliable). Conversely, if the integrated energy value is less than the predetermined threshold, then threshold comparator 1206 generates and indication that the finger is out of lock (i.e., is not receiving sufficient multipath energy to be considered reliable).

VII. Frequency Estimation

Turning back to FIG. 3, cross product circuit 324 generates a frequency estimate from the R-PICH. This frequency estimate is used by rotator 310 to rotate the early, on-time, and late pilot components as described above. This allows the finger to continue to track the pilot channel accurately in frequency. Since the accuracy of the frequency estimate is increased when a continuous pilot channel is present, the present invention is also useful for generating a frequency estimate.

Figure 13:
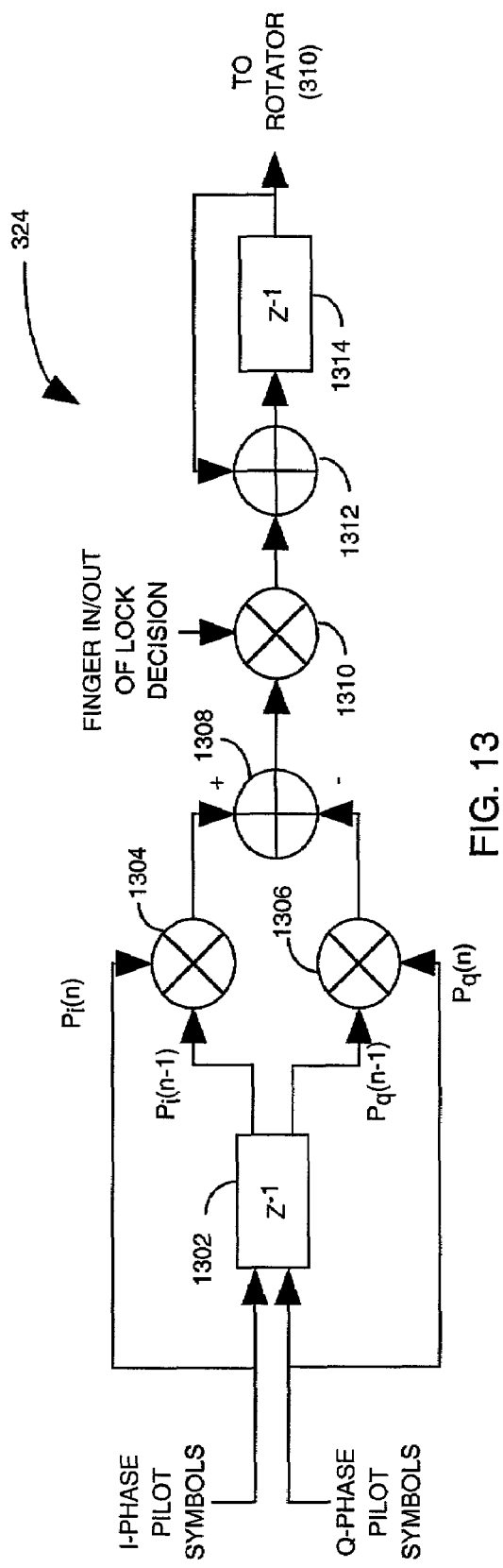
FIG. 13 is a functional block diagram of an exemplary embodiment of a cross product circuit for generating a frequency error estimate.

FIG. 13 illustrates a functional block diagram of an exemplary embodiment of the cross product circuit 324 for generating the frequency estimate. Cross product circuit 324 receives in-phase (I-phase) and quadrature-phase (Q-phase) pilot symbols for processing. These I-phase and Q-phase pilot symbols may be provided, for example, by continuous pilot generator 336. Alternately, they may be read directly from pilot phase RAM 322 and adjusted according to the sign decision from information sign demodulator 334. The I-phase and Q-phase pilot symbols, $P_i(n)$, $P_q(n)$, are input to filter 1302 where they are delayed by a predetermined amount. In the preferred embodiment, this amount is 256 chips, corresponding to one symbol accumulation described above. Additionally, the I-phase and Q-phase pilot symbols, $P_i(n)$, $P_q(n)$, are provided to cross multipliers 1304 and 1306, respectively, where they are cross multiplied with the one-symbol delayed output of filter 1302, $P_i(n-1)$, $P_q(n-1)$. As will be understood by a person of ordinary skill in the art, the cross multiplication performed by cross multipliers 1304 and 1306 results in in-phase and quadrature-phase frequency error estimate signals that are then combined in combiner 1308.

Gain element 1310 masks out the frequency error estimate signal by multiplying by a zero gain when the finger is out of lock, and by a non-zero gain when the finger is in lock. The finger in/out of lock decision generated by the circuit of FIG. 12 may be used to control gain element 1310. Combiner 1312 and filter 1314 act together to filter the frequency error estimate before it is provided as the frequency estimate signal to rotator 310 (FIG. 3).

In order to keep the time constant of the frequency tracking loop of the present invention small, allowing it to be more responsive, the cross product circuit 324 may read the I-phase and Q-phase pilot symbols directly from pilot phase RAM 322, rather than continuous pilot generator 336. However, the cross product circuit 324 must still take into account the sign ambiguity of the information symbols, $A^2$4,5 and $B^2$4,5. In order to do this, cross product circuit 324 may use the timing scheme shown below in TABLE I, which uses the naming conventions introduced in FIG. 10.

TABLE I

Frequency Error Estimation Timing

| Frequency Estimate FE(n) | First Cross Product Symbol P(n) | Second Cross Product Symbol P(n-1) |
|---|---|---|
| FE(1) | A1 | A0 |
| FE(2) | A2 | A1 |
| FE(3) | A3 | A2 |
| FE(4) | $A^1$4 | A3 |
| FE(5) | $A^1$4 | $A^1$4 |
| FE'(0) | B0-$A^1$4 | $A^2$4,5 |
| FE'(1) | B1 | B0 |
| FE'(2) | B2 | B1 |
| FE'(3) | B3 | B2 |
| FE'(4) | $B^1$4 | B3 |
| FE'(5) | $B^1$4 | $B^1$4 |
| FE''(0) | A'0-$B^1$4 | $B^2$4,5 |

The frequency estimates of TABLE I are calculated by cross product circuit 324. As can be seen, the cross product is calculated in a straightforward manner for the estimates for n=0 to n=3. However, for the n=4 estimates, only the first half (the non-punctured pilot symbols $A^1$4, $B^1$4, etc.) are used in the cross product to drive the frequency tracking loop. This is because information sign demodulator 334 has not yet accomplished the demodulation of the information chip sign for that symbol. For the same reason, there is no meaningful cross product calculated for n=5. The lost update for n=5 is compensated for in the following n=0 calculation. For example, the most accurate update available for n=5 would have been $A^1$4 cross $A^2$4,5. However, this is recovered in the following n=0 calculation by calculating B0-$A^1$4 cross $A^2$4,5.

It should be noted that the n=0 calculation should be adjusted according to the information chip sign decision.

Thus, present invention as disclosed above encompasses a method and apparatus for accounting for the sign uncertainty introduced by puncturing information chips of uncertain sign into an otherwise continuous pilot channel. The present invention resolves the sign ambiguity in the information chips punctured into the pilot channel, and then uses that decision to reconstruct a continuous-phase pilot channel that may be used thereafter for any application for which a continuous-phase pilot channel is advantageous. Several exemplary applications are disclosed above including frequency tracking, channel phase estimation, power control decisions, and finger in/out of lock decisions. These applications form various additional embodiments of the present invention. It will be understood by a person of ordinary skill in the art that various other applications and embodiments are included within the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We Claim:

1. In a wireless communications system, a method for preventing degradations in channel performance caused by puncturing information bits of uncertain sign into an otherwise continuous pilot channel comprising:
   reconstructing a non-punctured pilot channel of predetermined sign from information symbols of uncertain sign punctured into a sequence of pilot channel symbols of predetermined sign to produce a continuous sequence of pilot symbols; and
   calculating a channel phase estimate by using only the reconstructed continuous sequence of pilot symbols.

2. In a wireless communication system, a method of reverse link power control, comprising:
   reconstructing a non-punctured pilot channel of predetermined sign from information symbols of uncertain sign punctured into a sequence of pilot channel symbols of predetermined sign to produce a continuous sequence of pilot symbols;
   summing the energy value with at least one additional calculated energy value to produce a combined energy value;
   comparing the combined energy value to a threshold in a threshold comparator;
   outputting a reverse link power control decision based on the threshold comparison.

3. The method of claim 2 wherein an energy calculator calculates the energy value for the pilot symbols by computing the energy estimate of the information symbols and the pilot symbols, and combining the estimates over all fingers of a rake receiver in lock.

4. A method for determining when a finger of a rake receiver is in lock, comprising:
   reconstructing a non-punctured pilot channel of predetermined sign from information symbols of uncertain sign punctured into a sequence of pilot channel symbols of predetermined sign to produce a continuous sequence of pilot symbols;

providing the pilot symbols to an energy calculator to calculate an energy value for the pilot symbols;

inputting the calculated energy value to a received signal strength indicator filter to integrate the energy value over a predetermined time period, producing an integrated energy value;

comparing the integrated energy value to a predetermined threshold in a threshold comparator; and generating a finger lock decision based on the threshold comparison.

5. In a wireless communication system, a method for generating an accurate frequency estimate, comprising:

reconstructing a non-punctured pilot channel of predetermined sign from information symbols of uncertain sign punctured into a sequence of pilot channel symbols of predetermined sign to produce a continuous sequence of in-phase and quadrature-phase pilot symbols;

delaying the in-phase and quadrature-phase pilot symbols by a predetermined amount;

calculating a cross product of the in-phase and quadrature-phase pilot symbol to produce in-phase and quadrature-phase frequency error estimate signals; and masking a frequency error estimate signal out of a frequency estimate.

6. In a wireless communications system, an apparatus for preventing degradations in channel performance caused by puncturing information bits of uncertain sign into an otherwise continuous pilot channel comprising:

means for reconstructing a non-punctured pilot channel of predetermined sign from information symbols of uncertain sign punctured into a sequence of pilot channel symbols of predetermined sign to produce a continuous sequence of pilot symbols; and means for calculating a channel phase estimate by using only the reconstructed continuous sequence of pilot symbols.

7. In a wireless communication system, an apparatus for reverse link power control, comprising:

means for reconstructing a non-punctured pilot channel of predetermined sign from information symbols of uncertain sign punctured into a sequence of pilot channel symbols of predetermined sign to produce a continuous sequence of pilot symbols;

means for summing the energy value of the pilot symbols with at least one additional calculated energy value to produce a combined energy value;

means for comparing the combined energy value to a threshold in a threshold comparator; and means for outputting a reverse link power control decision based on the threshold comparison.

8. The apparatus of claim 7 wherein an energy calculator calculates the energy value for the pilot symbols by computing the energy estimate of the information symbols and the pilot symbols, and combining the estimates over all fingers of a rake receiver in lock.

9. An apparatus for determining when a finger of a rake receiver is in lock, comprising:

means for reconstructing a non-punctured pilot channel of predetermined sign from information symbols of uncertain sign punctured into a sequence of pilot channel symbols of predetermined sign to produce a continuous sequence of pilot symbols;

means for providing the pilot symbols to an energy calculator to calculate an energy value for the pilot symbols;

means for inputting the calculated energy value to a received signal strength indicator filter to integrate the energy value over a predetermined time period, producing an integrated energy value;

means for comparing the integrated energy value to a predetermined threshold in a threshold comparator; and means for generating a finger lock decision based on the threshold comparison.

10. In a wireless communication system, an apparatus for generating an accurate frequency estimate, comprising:

means for reconstructing a non-punctured pilot channel of predetermined sign from information symbols of uncertain sign punctured into a sequence of pilot channel symbols of predetermined sign to produce a continuous sequence of in-phase and quadrature-phase pilot symbols;

means for delaying the in-phase and quadrature-phase pilot symbols by a predetermined amount;

means for calculating a cross product of the in-phase and quadrature-phase pilot symbol to produce in-phase and quadrature-phase frequency error estimate signals; and means for masking a frequency error estimate signal out of a frequency estimate.

11. In a wireless communications system, an apparatus for preventing degradations in channel performance caused by puncturing information bits of uncertain sign into an otherwise continuous pilot channel comprising:

a continuous pilot generator to reconstruct a non-punctured pilot channel of predetermined sign from information symbols of uncertain sign punctured into a sequence of pilot channel symbols of predetermined sign to produce a continuous sequence of pilot symbols; and a pilot filter to calculate a channel phase estimate by using only the reconstructed continuous sequence of pilot symbols.

12. In a wireless communication system, an apparatus for reverse link power control, comprising:

a continuous pilot generator to reconstruct a non-punctured pilot channel of predetermined sign from information symbols of uncertain sign punctured into a sequence of pilot channel symbols of predetermined sign to produce a continuous sequence of pilot symbols;

a summer to sum the energy value of the pilot symbols with at least one additional calculated energy value to produce a combined energy value; and a threshold comparator to compare the combined energy value to a threshold and output a reverse link power control decision based on the threshold comparison.

13. The apparatus of claim 12 further comprising an energy calculator to calculate the energy value for the pilot symbols by computing the energy estimate of the information symbols and the pilot symbols, and combining the estimates over all fingers of a rake receiver in lock.

14. An apparatus for determining when a finger of a rake receiver is in lock, comprising:

a continuous pilot generator to reconstruct a non-punctured pilot channel of predetermined sign from information symbols of uncertain sign punctured into a sequence of pilot channel symbols of predetermined sign to produce a continuous sequence of pilot symbols;

an energy calculator to calculate an energy value for the pilot symbols;

a received signal strength indicator filter to integrate the calculated energy value over a predetermined time period, producing an integrated energy value;

a threshold comparator for comparing the integrated energy value to a predetermined threshold in a threshold comparator; and threshold comparator for generating a finger lock decision based on the threshold comparison.

15. In a wireless communication system, an apparatus for generating an accurate frequency estimate, comprising:
a continuous pilot generator to reconstruct a non-punctured pilot channel of predetermined sign from information symbols of uncertain sign punctured into a sequence of pilot channel symbols of predetermined sign to produce a continuous sequence of in-phase and quadrature-phase pilot symbols;
a filter to delay the in-phase and quadrature-phase pilot symbols by a predetermined amount;
a cross product circuit for calculating a cross product of the in-phase and quadrature-phase pilot symbol to produce in-phase and quadrature-phase frequency error estimate signals; and
a gain element for masking a frequency error estimate signal out of a frequency estimate.

* * * * *